March 31, 1970  J. N. HARESNAPE  3,504,047
MULTISTAGE PROCESS FOR THE SEPARATION OF HYDROCARBONS
Filed April 25, 1967  3 Sheets-Sheet 1

INVENTOR
JOHN NORMAN HARESNAPE
BY
MORGAN, FINNEGAN, DURHAM & PINE
ATTORNEYS

March 31, 1970  J. N. HARESNAPE  3,504,047
MULTISTAGE PROCESS FOR THE SEPARATION OF HYDROCARBONS
Filed April 25, 1967  3 Sheets-Sheet 3

INVENTOR
JOHN NORMAN HARESNAPE
BY
MORGAN, FINNEGAN, DURHAM & PINE
ATTORNEYS

United States Patent Office 3,504,047
Patented Mar. 31, 1970

3,504,047
MULTISTAGE PROCESS FOR THE SEPARATION
OF HYDROCARBONS
John Norman Haresnape, Sunningdale, England, assignor
to The British Petroleum Company Limited, London,
England, a corporation of England
Filed Apr. 25, 1967, Ser. No. 633,441
Claims priority, application Great Britain, Apr. 27, 1966,
18,386/66
Int. Cl. C07c 7/14
U.S. Cl. 260—674                              29 Claims

ABSTRACT OF THE DISCLOSURE

Mixtures of any of $C_8$ and $C_9$ alkyl-aromatic and alkenyl-aromatic hydrocarbons are separated by a multistage process including, in any order, one or more fractional crystallisation steps, one or more optional distillation steps and one or more sorption steps in each of which a liquid or vapour feedstock is contacted with a compound having the basic nuclear structure:

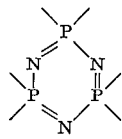

Figure 1:
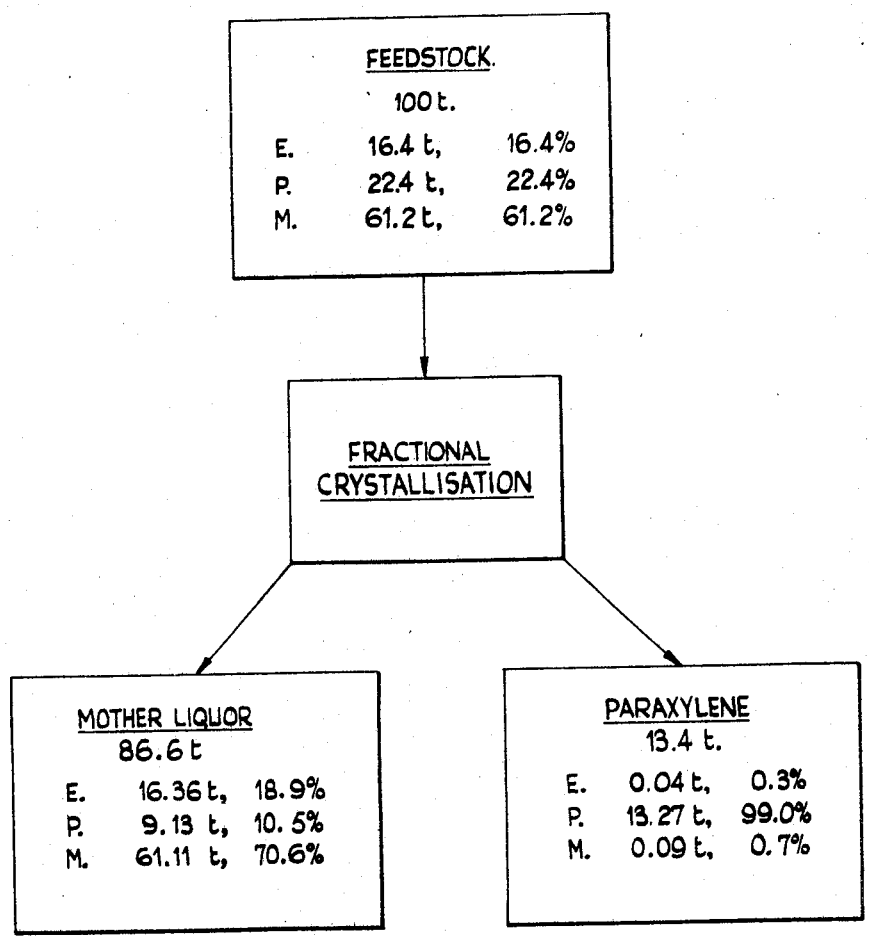

to form a complex with one or more of the components, and recovering the mixture depleted in these components, and the components from the complex.

---

This invention relates to multistage processes for the separation of the components of mixtures of hydrocarbons.

Allcock and Siegel (J.A.C.S. 1964, volume 86, page 5140) disclose that the compound tris-(o-phenylenedioxy) phosphonitrile trimer (alternatively known as tris-(o-phenylenedioxy) cyclotriphosphazene, and hereinafter referred to as TPNT, forms molecular inclusion compounds with certain organic liquids. The selective sorption of one component of the liquid mixtures heptane-cyclohexane, hexane-benzene, hexane-cyclohexane and carbon tetrachloride-benzene is also mentioned. It will be noted that each of these comprises a cyclic and a non-cyclic component differing in molecular constitution.

It is found that preferential sorption occurs on phosphonitrilic materials, as hereinafter set forth, and referred to as PNT materials, from the liquid or vapour phase, of one or more components of a mixture of certain substituted aromatic hydrocarbons.

Co-pending U.S. application Ser. No. 577,152 filed Sept. 6, 1966 discloses a process for the separation of one or more components of mixtures of hydrocarbons selected from alkyl and alkenyl-aromatic hydrocarbons having 8 or 9 carbon atoms per molecule. In particular, the separation of the $C_8$ alkyl aromatic isomers is discussed. Thus p-xylene may be separated from the other isomers at a high level of purity by selective sorption on TPNT and subsequent desorption. However, TPNT sorbs ethylbenzene, commonly present in mixed xylenes feedstocks, and although not sorbed to the same extent as is p-xylene, the two isomers tend to be desorbed together. Moreover, it is difficult to obtain m-xylene from a $C_8$ alkyl-aromatic isomer mixture by selective sorption alone in a sufficiently high yield and at a level of purity that would justify the setting up of a commercial process. m-Xylene is assuming great importance as a chemical intermediate, and a satisfactory process should provide high purity p-xylene and as pure a m-xylene stream as possible. In addition it would also be desirable to obtain an ethylbenzene product, since this is another useful chemical intermediate.

Separations meeting the foregoing requirements have been obtained using a combination of separation on PNT materials, fractional crystallisation, and, optionally, distillation. Although the present invention is exemplified by the separation of xylene isomers using TPNT, any of $C_8$ and $C_9$ alkyl and alkenyl aromatic hydrocarbons may be separated, and the invention is not restricted to the use of TPNT in the sorption stage or stages. The number of PNT separation stages, the number of crystallisation stages, and the sequence of stages may be varied according to the nature of the mixture, the yields and purities of the products required, and the properties of the PNT material being used.

The invention accordingly consists in a process for the separation of one or more components of a vapour or liquid mixture of hydrocarbons selected from alkyl-aromatic hydrocarbons having 8 or 9 carbon atoms per molecule and alkenyl aromatic hydrocarbons having 8 or 9 carbon atoms per molecule which comprises one or more fractional crystallisation stages, optionally one or more distillation stages, and one or more sorption stages each comprising contacting a feedstock with a compound which forms an inclusion complex more readily with one ore more components than with the other components and having the basic nuclear structure:

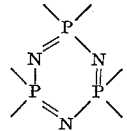

so as to preferentially sorb one or more components, and recovering a mixture from the sorption stage depleted in said sorbed components, the stages being in any order, and the effluent or a part thereof from any stage being optionally recycled to any other stage.

Mixtures separable by the process of the invention may contain, for example, the xylene isomers, and ethylbenzene, styrene, and the various geometrical isomers of the $C_8$ and $C_9$ alkenyl aromatic hydrocarbons.

The preferentially sorbed hydrocarbons from the sorption stage may be recovered by description from the inclusion complex and the sorbent re-used.

Considering now the PNT sorption stage or stages, it is in general found that aromatic hydrocarbons having the structure

and/or

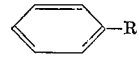

where $R^1$ is a methyl, ethyl, or vinyl group and where R is a methyl, ethyl, n-propyl, isopropyl or vinyl group, are sorbed preferentially to other $C_8$ and $C_9$ alkyl and/or alkenyl aromatic hydrocarbons. Thus p-xylene is sorbed preferentially to m-xylene, p-ethyltoluene is sorbed preferentially to m-ethyl toluene, n-propylbenzene is sorbed preferentially to mesitylene, ethylbenzene is sorbed preferentially to m-xylene and styrene is sorbed preferentially to o-xylene. It is also generally found that aromatic isomers having the structure

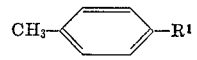

are preferentially sorbed to those having the structure

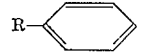

where R and R¹ are as defined above. Thus p-xylene is sorbed preferentially to ethylbenzene and p-ethyltoluene is sorbed preferentially to isopropylbenzene.

Operation in the vapour phase is preferred.

It is believed that in the presence of hydrocarbon molecules with which the PNT-type structure complexes (guest molecules) the phosphonitrilic material (host material) forms a structure having periodically recurring voids into which the guest molecules may fit.

As an example, in the case of TPNT it is believed that regular channels of hexagonal cross-section are formed in the presence of the guest molecules. The forces retaining the guest molecules within the channels are weak and thus guest molecules may readily be removed from the complex. On removal of the guest molecules it is believed that the TPNT crystal lattice is disrupted, to reform in the presence of further guest molecules.

Molecular shape is an important factor in determing the extent of sorption, i.e. the ease with which a guest molecule is accommodated within the PNT type structure. One facet of molecular shape is the cross-section, but this, although important, is not the only criterion of sorption. We have, for example, found that TPNT sorbs p-xylene preferentially to ethylbenzene although these may be regarded as having very similar cross sections. A further example is the preferential sorption of p-ethyl toluene over isopropylbenzene by TPNT.

The preferred compound of PNT-type structure is TPNT. It has the formula:

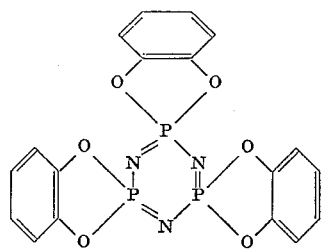

Other PNT-type materials which may form inclusion complexes of the type described are o-phenylenediaminophosphonitrile trimer and 2,3-naphthyldioxy phosphonitrile trimer.

TPNT itself may be prepared by reacting phosphonitrilic chloride trimer $(PNCl_2)_3$ with catechol. Phosphonitrilic chloride trimer may be prepared, together with other phosphonitrilic derivatives, by reaction of ammonium chloride with phosphorus pentachloride. TPNT is a white crystalline solid melting at 244–245° C.

The PNT-type material may be used in its free state or may be pelleted or deposited on an inert support. Suitable supports are, for example ground firebrick, diatomaceous earth, silica gel, alumina, or porous glass. It may be preferably to silanise the support. A particularly suitable, and preferred, supported sorbent comprises PNT-type material incorporated with one or more cured thermo-setting resins resistant to hydrocarbons under the conditions of use of the sorbent. Such a supported sorbent is described, inter-alia, in co-pending U.S. application Ser. No. 688,333 filed Dec. 6, 1967. The PNT-type material may also be deposited as a thin film on a laminar support, or on a fibrous support. It is found that the PNT-type material may be deposited from solution in an organic solvent by stirring and refluxing with the support material under nitrogen, cooling, filtering and drying under vacuum. It is deposited TPNT on 80–100 BSS mesh silanised diatomaceous earth from xylene solution in this way. It is also obtained TPNT loading of from 5 to 30% wt. on 8–12 BSS mesh ground firebrick by saturating it with a 6% w./v. solution in xylene, evaporating off the solvent, and repeating the operation until the required loading is reached.

The support material should be so chosen as to provide inter alia, a low pressure drop across the reactor containing the PNT-type material, and a high loading of PNT-type material per unit volume of the reactor, but care should be taken that the rate of equilibration of the PNT-type material with the hydrocarbon material is not too low.

The sorbate may be removed from the PNT-type material by displacement with another sorbate or by elution with an inert gas or liquid or by reduction in the ambient pressure i.e. reduction in the vapour pressure of the sorbed material, (the so-called "pressure swing" technique). Desorption can also be obtained by increasing the temperature. Which method is chosen will depend on factors of which those skilled in the art will be aware, such as the cost of inert gas elution or the provision of means to reduce the pressure in the pressure swing method, but in the preferred vapour phase method a pressure reduction desorption technique is preferred, and a particularly suitable means of achieving such pressure reduction is by condensation of the desorbed material. A process for production of the necessary vacuum for desorption by direct condensation of the effluent from the sorbent bed in a cyclic process is described in our Turnball et al., U.S. Patent 3,428,552, issued Feb. 18, 1969.

Stages employing any of the methods of desorption described are desirably operated on a cyclic basis, i.e. one cycle of complex formation and recovery of the complexed material is followed by another, since these sorption/desorption stages form only part of the processes of the invention. Any of the desorption techniques referred to may be used in the appropriate stages of a multistage process. It is found that satisfactory results may be obtained by the use of a fixed bed or sorbent, although this is not essential. The PNT material may complex with up to about 10 by wt., of its weight of hydrocarbon material, and it has been found most economic to operate at or near saturation capacity, removing only a portion of the sorbed molecules in each cycle. The feedstock to the sorbent bed may be diluted or undiluted. In the case of a vapour phase process an inert carrier gas, such as nitrogen, may be used.

A purging step may optionally be employed between the sorption and desorption steps. This purging step will use an inert gas or liquid, or purging will take place by pressure reduction as appropriate, and by this means surface sorbed and non-sorbed material is removed. The purging step may be omitted, for example, when the volume of the reactor in which desorption occurs is large enough, and the quantity of material removable by purging is small enough, for the relative concentration of such material to be neglected. In the case of the pressure reduction technique it is essential that the sorption, purge and desorption pressures should decrease in this order, but it is not necessary that these pressures should be distinct and uniform. Purging and desorption may be conveniently carried out as a continuous operation by progressive pressure reduction.

Any suitable combination of sorption, purging and desorption techniques may be used, if desired. One example of such a technique would be a vapour phase sorption, followed by purging with an inert gas, and finally desorption by pressure reduction. Where a diluted feed is used purging may be carried out by reduction in the feed concentration. The use, in a vapour phase operation, of a feed diluted with inert gas enables the pressure at any stage in the process to exceed the vapour pressure of the hydrocarbon components of the feed at the process temperature. If the pressure rises above the hydrocarbon vapour pressure when an undiluted fed is used then liquifaction will occur, which may be undesirable.

It may be desirable, in addition, to employ a number of sorbent beds in succession in any one stage of sorption/desorption and to pass the effluent from one bed, enriched in one or more components of the feed to that bed, to a further bed.

Tables 1, 2 and 3 below show the ranges from which the reaction conditions of a liquid phase-inert liquid PNT sorption/desorption stage, a vapour phase-inert gas PNT sorption/desorption stage, and a vapour phase-pressure reduction PNT sorption/desorption stage, respectively, in a multistage process, may be chosen. It will be realised that the cycle ranges take into account the use of a diluted or undiluted feed and the use or not of a purge.

In the sorption/desorption stage of a multistage process such as is here described the actual reaction conditions used will depend, among other factors, on the nature of the feedstock to the stage, the purity of the products required, the nature of the PNT-type material and the inclusion complex, for example their decomposition temperatures, whether the PNT-type material is supported or not, and if so, the nature of the support.

The following are common to all three types of process:

Ratio bed length to diameter—from 30:1 to 1:1
Particle size—from 4 to 100 mesh BSS
Temperature—15° C. up to 20° C. below the decomposition temperature of the PNT-sorbed component complex, for all sorption/desorption stages

TABLE 1

Inlet pressure—from 10 to 5000 p.s.i.a.
Cycle:
    Sorption—from 0.1 to 10 LHSV+inert liquid (up to 50 LHSV)
    Optional purge—inert liquid (up to 50 LHSV)
    Desorption—inert liquid (up to 50 LHSV)
Cycle times:
    Sorption—from 10 secs. to 60 minutes
    Purge—from 10 secs. to 60 minutes
    Desorption from 10 secs. to 5 hours

TABLE 2

Pressure—from 10 to 1000 p.s.i.a.
Cycle:
    Sorption—from 0.1 to 10 LHSV+inert gas (up to 100 GHSV)
    Optional purge—inert gas (up to 1000 GHSV)
    Desorption—inert gas (up to 1000 GHSV)
Cycle times:
    Sorption—from 10 sec. to 60 minutes
    Purge—from 10 secs. to 60 minutes
    Desorption—from 10 secs. to 5 hours

TABLE 3

Cycle:
    Sorption—from 0.1 to 10 LHSV+inert gas (up to 1000 GHSV)
Pressure:
    Sorption—from 10 to 1000 p.s.i.a.
    Optional purge—from 1 to 100 p.s.i.a.
    Desorption—from 0.1 to 10 p.s.i.a.
Cycle times:
    Sorption—from 10 secs. to 60 minutes
    Purge—from 10 secs. to 5 hours
    Desorption—from 10 secs. to 5 hours In Tables 2 and 3 the feed space velocity is calculated as the liquid, although the feed is in the vapour phase.

The following are the preferred ranges of conditions for the sorption/desorption stages of a vapour phase process, using TPNT for the separation of components of a mixture of $C_8$ alkyl-aromatic isomers. Table 4 shows the conditions for an inert gas desorption process and Table 5 gives those for a pressure reduction desorption process. The ranges of ratio of bed length to diameter, particle size, temperature, and cycle times shown in Table 4 are also applicable to Table 5.

TABLE 4

Ratio bed length to diameter—from 20:1 to 4:1
Particle size—from 4 to 100 BSS mesh
Temperature—from 60 to 220° C.
Pressure—from 10 to 500 p.s.i.a.
Cycle:
    Sorption—from 0.2 to 5 LHSV+inert gas (up to 500 GHSV)
    Optional purge—inert gas (up to 500 GHSV)
    Desorption—inert gas (up to 500 GHSV)
Cycle times:
    Sorption—from 30 secs. to 15 minutes
    Purge—from 10 secs. to 15 minutes
    Desorption—from 10 secs. to 150 minutes

TABLE 5

Pressure:
    Sorption—from 10 to 500 p.s.i.a.
    Optional purge—from 0.1 to 20 p.s.i.a.
    Desorption—from 0.01 to 5 p.s.i.a.
Cycle: Sorption—from 0.2 to 5 LHSV+inert gas (up to 500 GHSV)

If an undiluted feed is used the upper limit of pressure in both Tables 4 and 5 is about 150 p.s.i.g., since this is the vapour pressure of the feed at the decomposition temperature of TPNT. The upper limits of pressure shown are applicable when a diluted feed is used.

In a cyclic operation using a number of fixed beds the cycle times for sorption, purge and desorption should be simple ratios to each other to facilitate switching.

The fractional crystallisation stage or stages of the present multistage process may be carried out in accordance with any of the known fractional crystallisation procedures, and therefore will not be further discussed.

It is possible to produce, by PNT sorption/desorption alone, fractions enriched in one or more of the constituents of a mixture. Further stages of sorption/desorption may produce substantially pure components, but the production rate will be low because of the number of stages required and also because relatively long desorption times will be required to remove strongly sorbed substances from the PNT sorbent. Thus it is possible to produce, from a 25:25:50% wt. p-xylene-ethylbenzene-m-xylene mixture, a concentrate containing only 4% of the constituents other than m-xylene, in one step, and with an extraction efficiency of 60% with respect to m-xylene, but a long desorption time must be employed to prevent the more strongly held p-xylene and ethylbenzene from contaminating the m-xylene front. A fraction enriched in p-xylene, obtained from this mixture by one stage of PNT soprtion may have a p-xylene to ethylbenzene ratio of 3:1, i.e. there is a substantial ethylbenzene content. The efficiency of presently available processes involving fractional crystallization alone for the separation of xylene isomers is limited by the nature of the feedstock and in particular by the large amount of m-xylene present. The equilibrium contents of p-xylene and m-xylene in the mixed xylene feedstocks used are about 22–24%, and about 52%, respectively. Accordingly, about five units of mixed xylenes must be cooled for each unit of p-xylene potentially available. In addition, the p-xylene content of the mother liquors cannot be reduced much below about 10% without crystallisation of m-xylene occurring. In practice, therefore, only about 13% wt. of the mixed xylene feedstock of p-xylene is recovered.

The invention is illustrated with reference to the specific embodiments shown in the drawings which show, schematically, processes by which various xylene fractions may be obtained.

Figure 2:
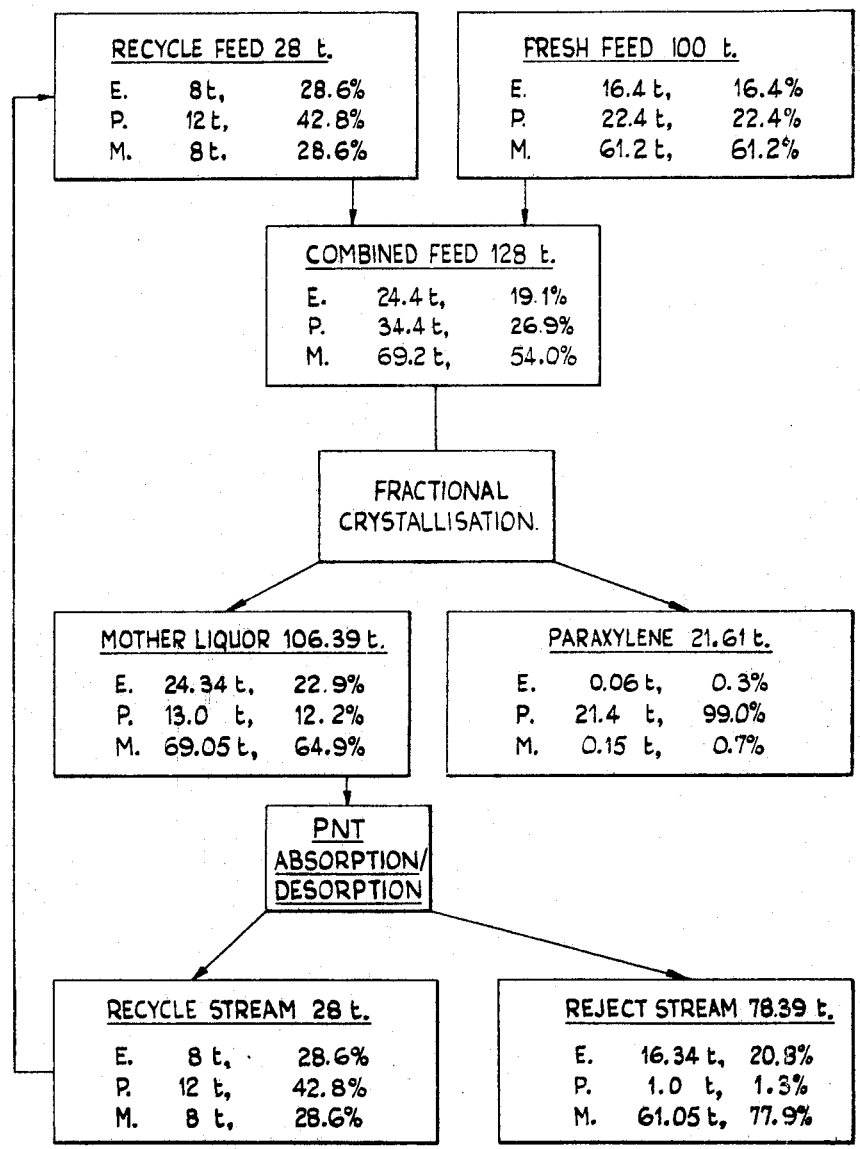
Figure 3:
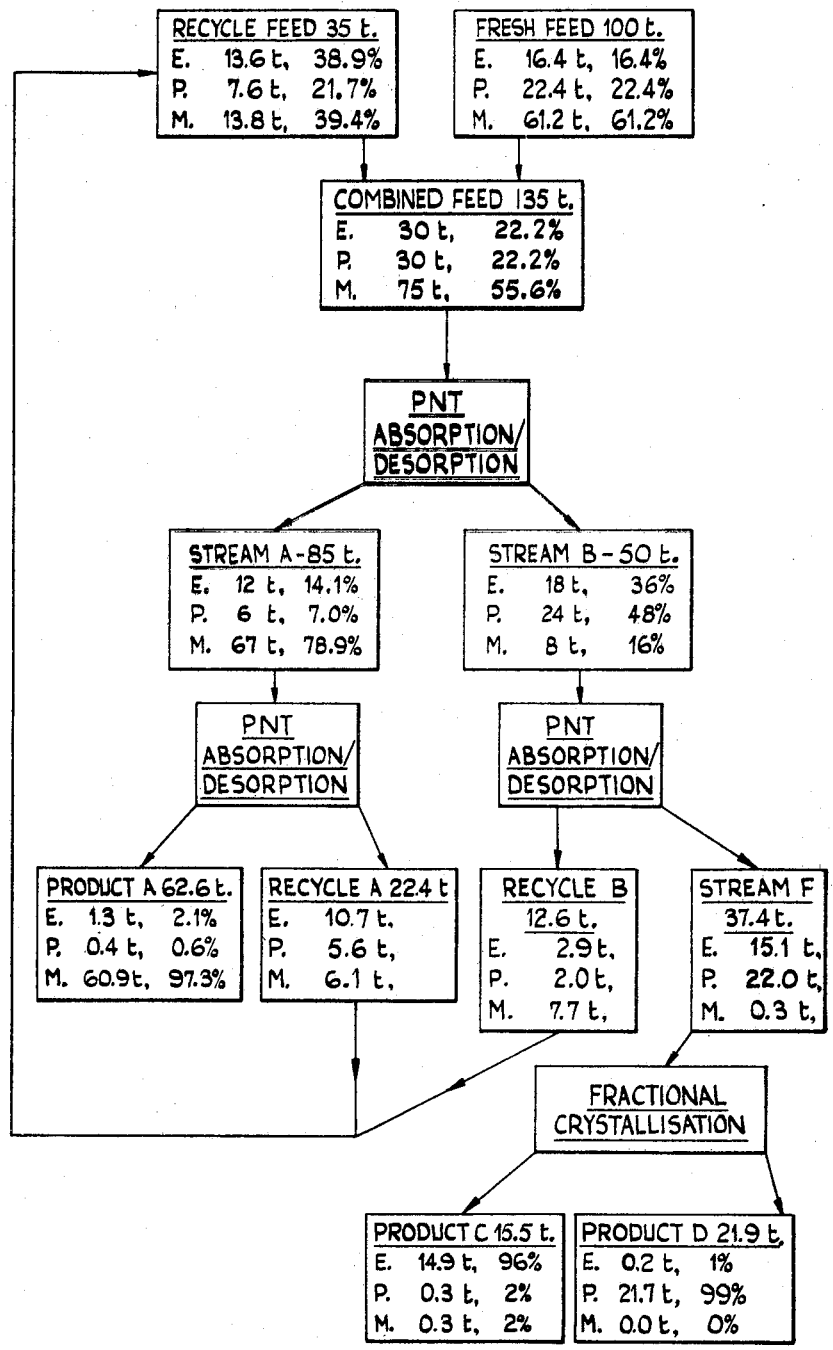

In the drawings, FIGURE 1 shows a conventional process employing fractional crystallisation only, FIGURE 2 shows a process by which fraction containing substantially pure p-xylene may be obtained using one fractional crystallisation stage and one stage of PNT sorption/desorption. FIGURE 3 shows a process by which substantially pure p-xylene and ethylbenzene may be obtained, together with a fraction containing over 90% wt. of the mixed xylene feedstock of m-xylene, by the use of three stages of PNT sorption/desorption and one stage of fractional crystallisation.

For the purposes of the embodiments shown in the figures a feedstock having the following percentage composition by weight was assumed:

Toluene ............................................. 0.4
Ethylbenzene ....................................... 16.0
p-Xylene ........................................... 22.4
m-Xylene ........................................... 52.1
o-Xylene ........................................... 9.1

For simplicity, ethylbenzene and toluene have been taken together and designated E, m- and o-xylene have been together designated M and p-xylene has been designated P. The composition of the feedstock was therefore:

Percent wt.
E ................................................. 16.4
M ................................................. 61.2
P ................................................. 22.4

In a process employing this feedstock and the prior art scheme of FIGURE 1 about 13% wt. of the total feedstock of a 99% p-xylene stream may be obtained. This is equivalent to recovery of only 60% of the p-xylene present. The residue of the p-xylene remains in the mother liquor forming 87% wt. of the original feedstock, and 10% wt. of the mother liquor itself.

By using the scheme shown in FIGURE 2 it will be seen that 21% wt. of the original feedstock of 99% p-xylene may be obtained. It has been assumed that the amount of p-xylene remaining in the mother liquor is increased compared to the fractional crystallisation process alone, from 10 to 12.2% wt. of the mother liquor, since the fractional crystallisation stage of FIGURE 2 is under greater load, and that the PNT sorption/desorption stage removes 92% wt. of the p-xylene fed to it from the fractional crystallisation stage, to give a stream (which is recycled) containing only 43% wt. of the stream of p-xylene. Even when these assumptions are made an improvement in 8% wt. of the original feedstock is obtained compared to the fractional crystallisation process alone. This is equivalent to an increase in the extraction efficiency (percentage recovery of the amount of p-xylene available in the feedstock) from 60% to 95.5%.

FIGURE 3 shows that by using the scheme indicated three product fractions may be obtained. The first of these, product A, contains over 90% wt. m-xylene with some o-xylene and traces of the other constituents of the feedstock. Stream F passed to the fractional crystallisation stage now contains a very small amount of m-xylene. Because of this stream F can be cooled to a much lower temperature than in the ordinary fractional crystallisation process (−140° F. compared to −100° F.) before precipitation of other isomers occurs, and the isomer then precipitated is ethylbenzene. Thus a product C containing 96% wt. of the product of ethylbenzene with a trace of toluene, and a product D containing 99% wt. of the product of p-xylene and substantially no m-xylene is obtained. The extraction efficiency with respect to the amount of p-xylene present in the feedstock is 97%, and with respect to the original amount of m-xylene is 99.6%.

The o-xylene present with the m-xylene, and the very small trace of toluene with the ethylbenzene may be removed, if desired, by distillation an an appropriate stage in the process.

The scheme of FIGURE 2 was employed experimentally as follows:

Since the process of FIGURE 2 is a cyclic process, and the compositions shown are those achieved in steady state operation, it was decided to start at the "combined feed" stage. Accordingly 50 gms. of a material having the same percentage composition as that given below was cooled over 20 minutes to −74° C. The resulting cake and mother liquor were transferred to a filter funnel and the mother liquor separated at −74° C. The mother liquor and cake were separately weighed and analysed by gas-liquid chromatography.

The mother liquor was used as feedstock to the PNT sorption/desorption stage, the following conditions being used in this stage, and desorption being effected by elution with nitrogen:

Temperature—155° C., 0.6 LHSV
Cycle:
   Sorption—+7 GHSV nitrogen
   Purge—190 GHSV nitrogen
   Desorption—190 GHSV nitrogen
Cycle times:
   Sorption—3 minutes
   Purge—1¼ minutes
   Desorption—70 minutes The sorbent was TPNT on firebrick. The volume of the reactor used in this stage was 200 ml. and the weight of TPNT present therein was approximately 17 gms.

The purged material and sorption overflow were combined and condensed together to give a product corresponding to the "reject stream" of FIGURE 2. The desorbate, corresponding to the "recycle stream" of FIGURE 2, was recycled to form, together with the "fresh feed," the "combined feed," the weight and composition of the "fresh feed" being calculated by difference from gas-liquid chromatographic analyses.

The results obtained were as follows:

|   | Fresh Feed (42.2 gms.) | | Desorbate (Figure 2 "Recycle Feed" and "Recycle Stream") (7.8 gms.) | | Combined Feed (50 gms.) | | Mother Liquor (33 gms.) | | Cake ("Paraxylene" of Figure 2) (17 gms.) | | Purge/Overflow ("Reject Stream" of Figure 2) (25.2 gms.) | |
|---|---|---|---|---|---|---|---|---|---|---|---|---|
|   | Grams | Percent | Grams | Percent | Grams | Percent | Grams | Percent | Grams | Percent | Grams | Percent |
| E | 5.7 | 13.5 | 3.8 | 48.8 | 9.5 | 19.0 | 8.1 | 24.4 | 1.4 | 8.0 | 4.3 | 17.0 |
| P | 10.5 | 24.9 | 3.0 | 38.4 | 13.5 | 27.0 | 3.5 | 10.6 | 10.0 | 59.0 | 0.5 | 2.0 |
| M | 26.0 | 61.6 | 1.0 | 12.8 | 27.0 | 54.0 | 21.4 | 65.0 | 5.6 | 33.0 | 20.4 | 81.0 |
| Total | 42.2 | 100.0 | 7.8 | 100.0 | 50.0 | 100.0 | 33.0 | 100.0 | 17.0 | 100.0 | 25.2 | 100.0 |

For comparison the prior art scheme of FIGURE 1 was examined experimentally, the "fresh feed" of the above experiment being subjected to fractional crystallisation. The procedure was as just described but the material was cooled to −68° C. over 20 minutes.

The results obtained were as follows:

|   | Fresh Feed (42.2 gs.) | | Cake ("Paraxylene" of Figure 1) (12.3 gms.) | | Mother Liquor (29.9 gms.) | |
|---|---|---|---|---|---|---|
|   | Grams | Percent | Grams | Percent | Grams | Percent |
| E | 5.7 | 13.5 | 0.7 | 5.7 | 5.0 | 16.7 |
| P | 10.5 | 24.9 | 7.5 | 61.0 | 3.0 | 10.0 |
| M | 26.0 | 61.6 | 4.1 | 33.3 | 21.9 | 73.3 |
| Total | 42.2 | 100.0 | 12.3 | 100.0 | 29.9 | 100.0 |

The percentage extraction efficiency with respect to p-xylene in the case of the process of the invention, i.e.

$$\frac{\text{Weight } p\text{-xylene in product}}{\text{Weight } p\text{-xylene in fresh feed}} \times 100$$

was $$\frac{10}{10.5} = 95$$

whereas the prior art fractional crystallisation process had an extraction efficiency of $$\frac{7.5}{10.5} = 72\%$$

The comparatively low purities of the products in the combined process were due to the small scale on which the experiment was carried out and the temperatures in the fractional crystallisation step being subentectic.

I claim:
1. A process for the separation of components from a vapour or liquid mixture of hydrocarbons selected from alkyl-aromatic hydrocarbons having 8 or 9 carbon atoms per molecule and alkenyl aromatic hydrocarbons having 8 or 9 carbon atoms per molecule, which comprises fractional crystallisation and sorption stages each comprising contacting a feed stock with a compound which forms an inclusion complex more readily with one or more components than with the other components and having the basic nuclear structure:

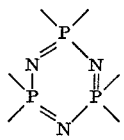

so as to preferentially sorb one or more components, and recovering a mixture from the sorption stage depleted in said sorbed components.

2. A process for the separation of components from a vapour or liquid mixture of hydrocarbons selected from alkyl-aromatic hydrocarbons having 8 or 9 carbon atoms per molecule and alkenyl aromatic hydrocarbons having 8 or 9 carbon atoms per molecule which comprises fractional crystallisation and sorption stages each comprising contacting a feedstock with tris-(o-phenylenedioxy) cyclotriphosphazine, so as to preferentially sorb one or more components, and recovering a mixture from the sorption stage depleted in said sorbed components.

3. A process as claimed in claim 1, in which the mixture comprises hydrocarbons selected from the xylene isomers and ethylbenzene.

4. A process as claimed in claim 1, in which the preferentially sorbed hydrocarbons from the sorption stage are recovered by desorption from the inclusion complex, and the sorbent re-used.

5. A process as claimed in claim 1, in which the said compound is incorporated with one or more cured thermosetting resins resistant to hydrocarbons under the condition of use of the sorbent.

6. A process as claimed in claim 4, which desorption is carried out by displacement of the sorbed components by another sorbate, by elution with an inert gas or liquid, or by reduction in the ambient pressure.

7. A process as claimed in claim 6, being a vapour phase process, in which desorption is carried out by reduction in the ambient pressure, such reduction in pressure being achieved by condensation of the desorbed material.

8. A process as claimed in claim 1, operated on a cyclic basis at or near saturation capacity of the said compound, only a portion of the sorbed molecules being removed in each cycle.

9. A process as claimed in claim 1, in which the feed to the sorbent bed is diluted with an inert gas in the case of a vapour phase process or an inert liquid in the case of a liquid phase process.

10. A process as claimed in claim 4, in which a purging stage is interposed between the sorption and desorption steps, and in which purging is carried out by the same means as that used for desorption.

11. A process as claimed in claim 10, in which purging and desorption are achieved successively by reduction in the ambient pressure, it being provided that the ambient pressure decreases in the order; sorption, purge, desorption.

12. A process as claimed in claim 10, in which purging and desorption are achieved by elution with an inert gas or liquid.

13. A liquid phase process as claimed in claim 1, in which the reaction conditions for the sorption stages are chosen from the following ranges:

TABLE I

Inlet pressure from 10 to 5000 p.s.i.a.

Cycle:
  Sorption—from 0.1 to 10 LHSV + inert liquid (up to 50 LHSV)
  Optional purge—inert liquid (up to 50 LHSV)
  Desorption—inert liquid (up to 50 LHSV)

Cycle times:
  Sorption—from 10 secs. to 60 minutes
  Purge—from 10 secs. to 60 minutes
  Desorption—from 10 secs. to 5 hours 14. A vapour phase process as claimed in claim 1, in which the reaction conditions for the sorption stages are chosen from the following ranges:

TABLE II

Pressure—from 10 to 1000 p.s.i.a.

Cycle:
  Sorption—from 0.1 to 10 LHSV + inert gas (up to 1000 GHSV)
  Optional purge—inert gas (up to 1000 GHSV)
  Desorption—inert gas (up to 1000 GHSV)

Cycle times:
  Sorption—from 10 secs. to 60 minutes
  Purge—from 10 secs. to 60 minutes
  Desorption—from 10 secs. to 5 hours 15. A vapor phase process as claimed in claim 1, in which the reaction conditions for the sorption stages are chosen form the following ranges:

TABLE III

Cycle: sorption—from 0.1 to 10 LHSV + inert gas (up to 1000 GHSV)

Pressure:
  Sorption—from 10 to 1000 p.s.i.a.
  Optional purge—from 1 to 100 p.s.i.a.
  Desorption—from 0.1 to 10 p.s.i.a.

Cycle times:
  Sorption—from 10 secs. to 60 minutes
  Purge—from 10 secs. to 5 hours
  Desorption—from 10 secs. to 5 hours 16. A vapour phase process for the separation of components from a mixture of alkyl-aromatic hydrocarbon isomers having 8 carbon atoms per molecule which comprises fractional crystallisation and sorption stages each comprising contacting a feedstock with tris-(o-phenylenedioxy) cyclotriphosphazine, so as to preferentially sorb one or more components, recovering a mixture depleted in said sorbed components, and desorbing said sorbed components from the sorbent by elution with nitrogen, the reaction conditions for the sorption stages being chosen from the following ranges:

Ratio bed length to diameter—from 20:1 to 4:1
Particle size—from 4 to 100 BSS mesh
Temperature—from 60 to 220° C.
Pressure—from 10 to 500 p.s.i.a.

Cycle:
    Sorption—from 0.2 to 5 LHSV + inert gas (up to 500 GHSV)
    Optional purge—inert gas (up to 500 GHSV)
    Desorption—inert gas (up to 500 GHSV)

Cycle times:
    Sorption—from 30 secs. to 15 minutes
    Purge—from 10 secs. to 15 minutes
    Desorption—from 10 secs. to 150 minutes 17. A vapour phase process for the separation of components from a mixture of alkyl-aromatic hydrocarbon isomers having 8 carbon atoms per molecule, which comprises fractional crystallisation and sorption stages each comprising contacting a feedstock with tris-(o-phenylenedioxy) cyclotriphosphazene, so as to preferentially sorb one or more components, recovering a mixture depleted in said sorbed components, and desorbing said sorbed components from the sorbent by reduction in the ambient pressure, the reaction conditions for the sorption stages being chosen from the following ranges:

Ratio bed length to diameter–from 20:1 to 4:1
Particle size–from 4 to 100 BSS mesh
Temperature–from 60 to 220° C.
Pressure:
    Sorption–from 10 to 500 p.s.i.a
    Optical purge–from 0.1 to 20 p.s.i.a
    Desorption–from 0.01 to 5 p.s.i.a.
Cycle: sorption–from 0.2 to 5 LHSV
Cycle times:
    Sorption–from 30 secs to 15 minutes
    Purge–from 10 secs. to 15 minutes
    Desorption–from 10 secs. to 150 minutes 18. A process as claimed in claim 1 wherein a distillation stage is included.

19. A process as claimed in claim 1 wherein said stages are operated on a cyclic basis.

20. A process as claimed in claim 18 wherein said stages are operated on a cyclic basis.

21. A process as claimed in claim 2 wherein a distillation stage is included

22. A process as claimed in claim 2 wherein said stages are operated on a cyclic basis.

23. A process as claimed in claim 21 wherein said stages are operated on a cyclic basis.

24. A process as claimed in claim 16 wherein a distillation stage is included

25. A process as claimed in claim 16 wherein said stages are operated on a cyclic basis.

26. A process as claimed in claim 24 wherein said stages are operated on a cyclic basis.

27. A process as claimed in claim 17 wherein a distillation staged is included.

28. A process as claimed in claim 17 wherein said stages are operated on a cyclic basis.

29. A process as claimed in claim 27 wherein said stages are operated on a cyclic basis.

References Cited

Allcock et al.: J.A.C.S., vol. 86, pp. 5140–4, December 5, 1964.

DELBERT E. GANTZ, Primary Examiner

C. R. DAVIS, Assistant Examiner

U.S. Cl. X.R.

260—669